A. LOEHNER.
Shaft-Coupling.

No. 209,765.                Patented Nov. 12, 1878.

ATTEST.
Alex J. Thomson
W. H. Daly

INVENTOR.
August Loehner

UNITED STATES PATENT OFFICE.

AUGUST LOEHNER, OF ST. LOUIS, MISSOURI, ASSIGNOR OF ONE-HALF HIS RIGHT TO JOHN B. REILLY, OF SAME PLACE.

IMPROVEMENT IN SHAFT-COUPLINGS.

Specification forming part of Letters Patent No. 209,765, dated November 12, 1878; application filed September 23, 1878.

*To all whom it may concern:*

Be it known that I, AUGUST LOEHNER, of the city of St. Louis and State of Missouri, have invented certain new and useful Improvements in Shaft - Couplings; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

The object of my invention is to provide a rigid coupling attachment for shafts of various lengths, and of the same or of different diameters. By the closing up of a shoulder-nut, when acting upon compressor-rings and elastic centering double-taper sleeves, as will presently be shown, any two lengths of shaft, of equal or varying diameters, will automatically adjust their centers, and be rigidly and perfectly held together, regardless of strain or vibration.

The nature of my invention consists in an improved coupling for equal-sized shafting, or, whenever it becomes advantageous or necessary, for shafting of unequal diameters, to effect which I attach by set-screws to the shaft of the largest diameter a double - tapered socket-sleeve, upon which internally-tapered compressor-rings are drawn by a shouldered nut, which, by acting upon the shoulder of one of the compressor-rings which has a blank rim, and simultaneously upon the threaded rim of the opposite compressor-ring, the ends of the shafts are centered, and the sleeves so tightly made to inclose the shaft ends as to prevent any subsequent loosening of the joint by vibration or jarring of the parts, which heretofore has been an evil attending most of the coupling methods in use.

Figure 1:
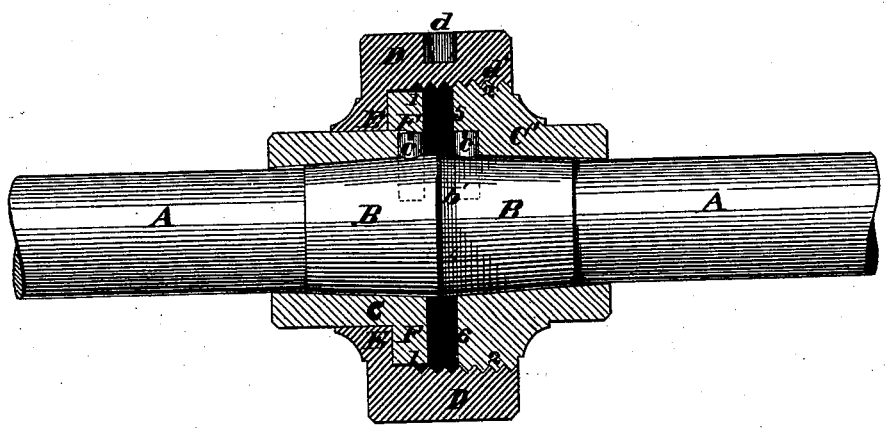
Figure 2:
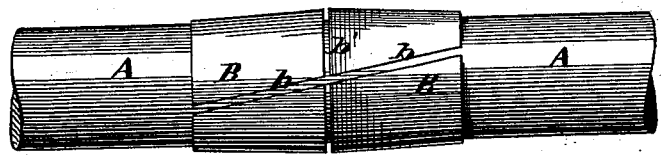
Figure 3:
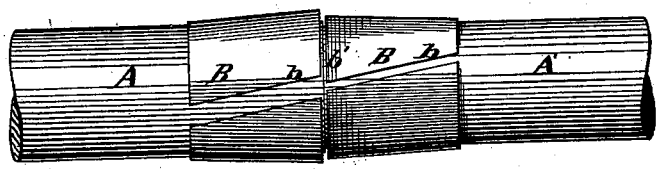

In the accompanying drawings, in which similar letters of reference indicate like parts, Figure 1 is an elevation embodying my invention. Fig. 2 is a perspective of two shaft ends of equal diameters as held together by the double-taper sleeve. Fig. 3 is a similar view, showing the ends of two diverse-sized shafts, and the manner of expanding or contracting the double-taper sleeve for its accommodation to the varying size of each.

The shafts A, Figs. 1 and 2, are inserted in the sleeve B. The said sleeve B is ordinarily designed to be a good fit upon the ends of any desired size of shaft; but when it becomes necessary to couple diverse-sized shafting together, as shown by the shaft ends A and A', Fig. 3, the slit b', which nearly encircles the sleeve, and the oblique slits b permit the said sleeve to expand, as is also shown in said Fig. 3 by B, on the said shaft A, while a contraction of the sleeve is shown by B, on A', same figure. The set-screws c, Fig. 1, are intended to securely fasten the said sleeve B to each of the shaft ends, as therein shown by dotted lines.

The compressor-rings C C', which are taper-bored, are to be slipped over both ends of the said sleeve B. The shoulder F on the compressor-ring C is to be met by the inverted shoulder E on the nut D, by which, when the screw-threads d' and 2 engage, the said compressor-rings can be drawn together, and the desired compression be effected through the action of the coinciding tapers inside of the said compression-rings C C' and on the said sleeve B.

It will readily be seen that the expansion difference caused by the passage of the said sleeve B over a varying-sized shaft, as shown in Fig. 3, must not in any case for an ordinary sleeve be so great as to prevent the said compression-ring C from slipping on B, so as to allow the screw-threads d' on the shouldered nut D readily to engage with similar screw-threads on the rim 2 of said compression-ring C'.

The said nut D has holes d, into which a wrench-bar may be inserted to force the closure of the compression-rings to a proper degree of tightness.

5 and 6 are spaces between the inner faces of the compression-rings.

The heads of the said set-screws c are permitted to enter seats sunk therefor in the faces of the compression-rings.

What I claim as my invention, and desire to secure by Letters Patent of the United States, is—

1. In the double-taper sleeve B, the accommodation-slittings $b$ and $b'$ as means for the reception and centering of shafts of equal or unequal diameters, as herein set forth.

2. In combination with said accommodation-slittings $b$ and $b'$, the compression-rings C C′, blank shouldered rim 1 C, and the screw-threaded rim 2 C′ for light compression through the action of the shouldered nut D, as described and set forth herein.

3. In the secure attachment of the shaft ends of a coupling-joint to the sleeves B, the set-screws $c$, as set forth and herein shown.

In testimony that I claim the foregoing as my own invention I affix my signature in presence of two witnesses.

AUGUST LOEHNER.

Witnesses:
 JOSEPH E. WARE,
 THOMAS E. PRICE.